United States Patent [19]

Ota

[11] 4,412,156
[45] Oct. 25, 1983

[54] POWER SUPPLY FOR AN AC DISCHARGE LAMP

[75] Inventor: Masataka Ota, Okazaki, Japan

[73] Assignee: Elmo Company, Limited, Nagoya, Japan

[21] Appl. No.: 294,048

[22] Filed: Aug. 18, 1981

[30] Foreign Application Priority Data

Sep. 3, 1980 [JP] Japan ................... 55-122592

[51] Int. Cl.³ .............................................. G05F 1/00
[52] U.S. Cl. ................................... 315/308; 315/205;
315/209 R; 315/287; 315/226
[58] Field of Search ............. 315/308, 287, 202, 205,
315/209 R, 226

[56] References Cited

U.S. PATENT DOCUMENTS 3,999,100 12/1976 Dendy ........................... 315/287
4,162,429 7/1979 Elms et al. ..................... 315/308
4,356,433 10/1982 Linden .......................... 315/308

Primary Examiner—Harold Dixon
Attorney, Agent, or Firm—Dennison, Meserole, Pollack & Scheiner

[57] ABSTRACT

A power supply for an ac discharge lamp utilizes a switching transistor for turning on and off the dc current from a dc power circuit. The dc current is then fed to a low pass filter for supplying the dc power to the lamp with alternating polarity. A voltage and a current sensing circuits effective to control the dc power to a substantially constant level is connected to a control circuit for controlling the on and off times of the switching transistor. In such a power supply, the voltage and current sensing circuits are made up of transformers whereby the high-voltage circuit section is effectively separated and insulated from the low-voltage circuit section so as to prevent any possible electrical shocks.

3 Claims, 3 Drawing Figures

POWER SUPPLY FOR AN AC DISCHARGE LAMP

BACKGROUND OF THE INVENTION

1. Field of the Invention

The present invention relates to a power supply for a matal halide or like ac discharge lamp, and more particularly to such a supply for supplying substantially constant dc power to the lamp with alternating polarity.

2. Description of the Prior Art

Metal halide discharge lamps have severe power supply requirements. During lamp warm up after ignition, the lamp voltage is considerably lower than after the operating temperature has been reached, and the lamp current is considerably higher than during later operation. Furthermore, both during warm up and later operation, a maximum lamp power allowable can not be exceeded without damaging the lamp.

Thus both voltages and currents must be provided to the ac discharge lamp by an ac power supply so that the abovementioned requirements may be satisfied. Moreover, it is desirable to provide constant power to the lamp, so as to insure the constant light output and color temperature.

Conventionally, ballast-type power supplies have been used wherein an inductive ballast such as a choke and an inductor is connected in series with the lamp, and the voltage is controlled to drop in response to the amount of current drawn, so as to regulate the power output. In such ballast-type supplies, the inductive ballast itself is very bulky and massive. Further, in the conventional ballast-type supplies, a 200 volt source typically must be used for an ac metal halide lamp that is rated, for example, at 45 volts (higher than the related voltage). Thus to operate from a 100 volt ac line, a boosting transformer must be used in addition to the ballast inductor. Further since the amount of current to be stabilized by the inductor depends on the magnitude of supply voltage, taps must be provided to obtain constant voltage even when different line voltages are applied. As a consequence, all of these factors add to the bulkiness of such a ballast-type power supply and the complexity of the individual component part, and may lead to reduced efficiency.

The prior art, in trying to solve the problems associated with the ballast-type power supply, has employed a system which does not require an inductive ballast and yet effective for providing constant power to the ac metal halide lamp. An example of such power supplies is disclosed in Japanese Laid-Open Patent Publication No. 51-141488.

The power supply disclosed in the publication utilizes a switching regulator, as shown in FIG. 1.

In the power supply, the line voltage supplied between input terminals A and B is rectified through a dc power circuit 1, and the direct current thus obtained is periodically turned on and off by a switching transistor 2. Then the high frequency component of the current is removed by a low pass filter 6 consisting of a diode 3, an inductor 4 and a capacitor 5. Specifically, the outputs from each sensing circuit of a dc voltage sensing circuit 7 and a dc current sensing circuit 8 both provided in the output line of the low pass filter 6 are summed in a summing circuit 9. The summed output voltage is then inputted to an error detector circuit 10 which is provided in a control circuit for controlling the on-time of the switching transistor 2. The output voltage is further compared with the reference voltage from a reference voltage generating circuit 11 so as to obtain an error signal indicative of the voltage difference between the reference voltage and the summed output voltage.

The error signal is then supplied to a voltage-pulse width converter 13 for altering the pulse width of a constant frequency pulse signal from an ocillator 12 which operates with the converter 13. The output voltage of the converter 13 is effective to control the on or off time of the switching transistor 2 so as to maintain the error signal at constant level. As a consequence, a substantially constant dc power may be supplied to the load. The dc power is then fed to a commutator circuit 14. A pair of transistors 15 and 16 and a pair of transistors 17 and 18 of the commutator circuit 14 are periodically alternately controlled to be turned on through a commutator control circuit 19 so as to connect the regulated dc power to an ac discharge lamp 20.

It is to be noted that during the lamp 20 warm up, a large amount of current will flow because of the small impedance of the lamp 20. However, the voltage and current are sensed through the dc voltage and current sensing circuits 7 and 8, and the power being supplied to the lamp 20 is controlled so as not to exceed the predetermined level. This is accomplished by decreasing the pulse width of the constant frequency pulse signal from the voltage-pulse width converter 13 and reducing the on-time of the switching transistor 2 so as to maintain the error signal from the circuits 7 and 8 at a desired level. When the normal operating level is reached, the impedance of the lamp 20 increases. However, a substantially constant power may be supplied to the lamp 20 by increasing the pulse width of the constant frequency pulse signal from the converter 13 and prolonging the on-time of the switching transistor 2. Accordingly, since the power supply utilizes a switching transistor 2, it is considerably smaller and lighter than those using inductive ballasts, as well as being highly efficient.

It should be noted, however, that even in such a switching regulator type supply it is necessary to adjust the dc voltage and current sensing circuits 7 and 8 or the summing circuit 9 so as to provide constant power to the discharge lamp 20. The adjustment must be accomplished under normal operating condition with the lamp 20 connected to the power supply. This may cause an electrical shock inadvertently during the adjustment.

An object of the present invention is to provide a power supply which is compact, lightweight and highly efficient.

Another object is to provide a power supply which is safe to use where there is no possibility of causing electrical shocks.

SUMMARY OF THE INVENTION

According to the inventive power supply, while the inductor is provided in the input line or the output line of the switching transistor for the switching regulator type power source just described, it is replaced by a power transformer of which the primary winding is separated for insulation from the secondary winding. The ac voltage developed at the secondary winding is then sensed to thereby control the on-time of the switching transistor. Thus the high-voltage circuit section for the ac discharge lamp is effectively separated and insulated from the low-voltage circuit sections as of the summing circuit and the control circuit so as to prevent possible electrical shocks.

DETAILED DESCRIPTION OF THE PREFERRED EMBODIMENT

Figure 1:
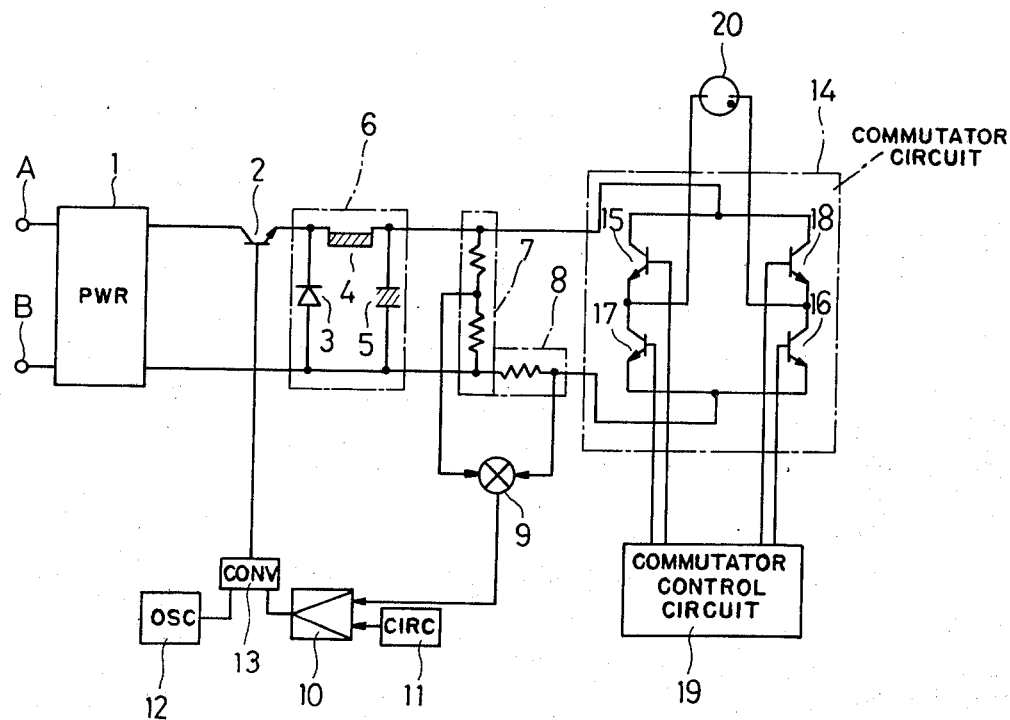
FIG. 1 is a block diagram illustrating a circuit configuration according to the prior art power supply.
Figure 2:
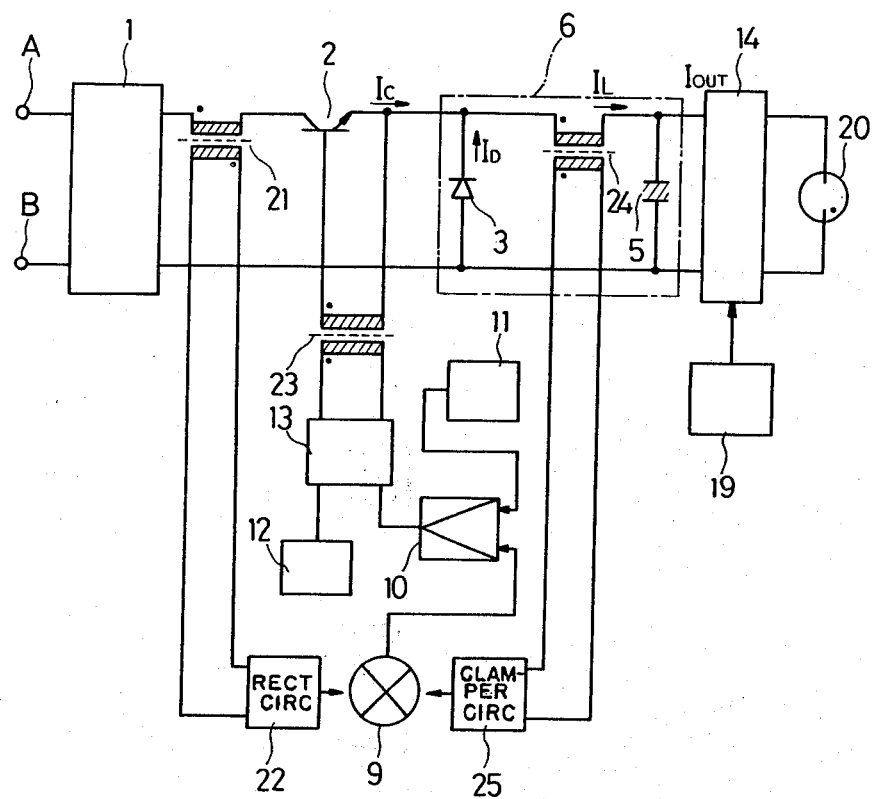
FIG. 2 is a block diagram illustrating a circuit configuration of a power supply according to one embodiment of the present invention.

Referring now to the drawings and to FIG. 2 in particular, shown therein is a circuit configuration of a power supply in accordance with one embodiment of the present invention. Like component parts are given like reference numbers for purposes of convenience in comparing with FIG. 1 discussed in the preceeding paragraphs.

In FIG. 2, there is shown a current sensing transformer 21 of which the primary winding is connected between a dc power circuit 1 and a switching transistor 2. The secondary winding of the transformer 21 is connected to a rectifier circuit 22, and the output of the rectifier circuit 22 is connected to a summing circuit 9. Further, there is provided a transformer 23, the primary winding of which is being connected to a voltage-pulse converter 13 and the secondary winding being connected to the base of the transistor 2.

In the power supply according to the present invention, the low pass filter 6 shown in FIG. 1 includes a voltage sensing transformer 24 instead of the inductor 4. The primary winding of the transformer 24 is connected to the low pass filter 6. It is important to note that the secondary winding of the voltage sensing transformer 24 is formed of a pick-up coil having minimum inductance required for picking up the leakage flux of the primary winding, so that the primary winding may act as an inductor. The secondary winding of the voltage sensing transformer 24 is connected to a clamper circuit 25 adapted for applying direct current to ac signals. Further, the output of the clamper circuit 25 is connected to the summing circuit 9.

Having thusly described the configuration of the power supply, the operation will now be described.

Figure 3:
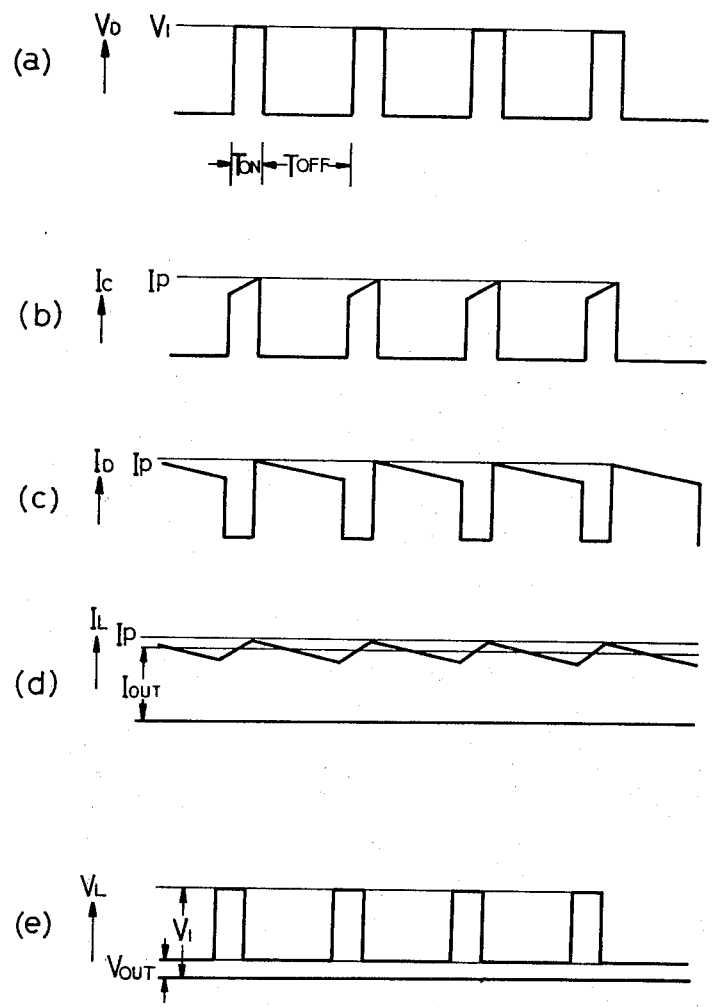
FIG. 3 is a chart of the output signal waveforms of each component part, illustrating the operation of the power supply according to the present invention.

Let $V_I$ denote the dc voltage produced in the dc power circuit 1. In response to the on-time $T_{ON}$ and the off-time $T_{OFF}$ of the switching transistor 2, voltage $V_D$ is produced across the diode 3, which represents a pulse waveform of peak value $V_I$ and pulse width $T_{ON}$, as shown in FIG. 3(a). The voltage $V_D$ is then smoothed by the low pass filter 6. As a result, a dc voltage $V_{OUT}$ can be obtained. That is, $$V_{OUT} = V_I \times \frac{T_{ON}}{T_{ON} + T_{OFF}}$$

At this time, a current $I_C$ having a waveform as shown in FIG. 3(b) flows through the collector of the switching transistor 2, and a forward current $I_D$ as shown in FIG. 3(c) flows through the diode 3. As a consequence, a current $I_L$ having average output value $I_{OUT}$ as shown in FIG. 3(d) flows through the low pass filter 6 inductor, that is the primary winding of the voltage sensing transformer 24. Then the collector current $I_C$ of the switching transistor 2 flows through the primary winding of the current sensing transformer 21, so as to produce, in the secondary winding of the transformer 21, a voltage having differential waveform of the collector current of the switching transistor 2. The output voltage is then rectified by the rectifier circuit 22 to obtain a sensed dc voltage indicative of the peak value $I_P$ of the collector current $I_C$.

On the other hand, to the primary winding of the voltage sensing transformer 24 provided in the low pass filter 6, there is applied a voltage difference between the voltage $V_D$ (see FIG. 3(a)) produced across the above-mentioned diode 3 and the voltage $V_{OUT}$ produced across the capacitor 5. The waveform of the voltage difference $V_L$ is shown in FIG. 3(e). The smoothed dc current of the voltage difference may be expressed as:

$$V_{LD} = (V_I - V_{OUT}) \times \frac{T_{ON}}{T_{ON} + T_{OFF}}$$

where $V_{LD}$ is the smoothed dc current.

Since the dc voltage $V_I$ produced in the dc power circuit 1 is extremely higher than the dc voltage $V_{OUT}$ to be supplied to the lamp 20, we can express, $V_I - V_{OUT} \approx V_I$, and thus we obtain, $$V_{LD} = (V_I - V_{OUT}) \frac{T_{ON}}{T_{ON} + T_{OFF}} \approx V_I \frac{T_{ON}}{T_{ON} + T_{OFF}} = V_{OUT}$$

Thus, it may be deemed that the smoothed dc voltage $V_{LD}$ produced across the primary winding of the voltage sensing transformer 24 is substantially equal to the dc voltage $V_{OUT}$.

The ac component of the voltage difference $V_L$ is then sensed through the secondary winding of the voltage sensing transformer 24, and a dc voltage is added via the clamper circuit 25 to the ac component of the sensed voltage difference $V_L$ so as to obtain a smoothed voltage $V_{LD}$. The voltage $V_{LD}$ is then supplied to the summing circuit 9. The sensed dc voltage indicative of the peak value $I_P$ of the transistor 2 collector current $I_C$ and the sensed dc voltage $V_{LD}$ indicative of the voltage $V_L$ developed across the primary winding of transformer 24 through the clamper circuit 25 are supplied to the summing circuit 9 so as to obtain a summed output voltage. In the same manner with the power supply as shown in FIG. 1, an error signal is obtained as a difference between the summed output voltage and the reference voltage. The duty ratio of the on-to-off times of the switching transistor 2 is controlled in response to the magnitude of the error signal so that the error signal may be maintained at the desired level, resulting in a substantially constant power output to the lamp 20.

What is claimed is:

1. A power supply adapted for use with an ac discharge lamp, comprising:
    a dc power circuit for generating dc power,
    a switching transistor for turning on and off the dc power from said dc power circuit,
    a low pass filter for receiving the dc power from said switching transistor and for supplying smoothed dc power,
    a commutator circuit for supplying the dc power from said low pass filter with alternating polarity to said ac discharge lamp,
    a commutator control circuit for controlling said cummutator circuit, a first transformer connected in series between said dc power circuit and said switching transistor, and adapted for sensing the current of the dc power, a second transformer connected in series between said switching transistor and said commutator circuit, and adapted for sensing the output voltage from said switching transistor, a rectifier circuit for rectifying the current sensed by said first transformer, a clamper circuit for applying dc voltage to the voltage sensed by said second transformer, a summing circuit for summing both of the output voltages from said rectifier circuit and said clamper circuit, an error detector circuit for comparing the output voltage from said summing circuit with a reference voltage from a reference voltage generating circuit in conjunction with said error detector circuit, and for producing an error signal indicative of the voltage difference therebetween, a voltage-pulse width converter for receiving a constant frequency pulse signal produced from an oscillator in conjunction with said converter, and altering the pulse width of the pulse signal in response to the error signal from said error detector circuit, and a third transformer for supplying the output signal from said voltage-pulse width converter to the input terminal of said switching transistor.

2. A power supply as defined in claim 1 wherein each of said first, second and third transformers is an insulated transformer.

3. A power supply as defined in claim 1 wherein said second transformer is adapted to act as an inductor of a low pass filter.

* * * * *